Figure 4:
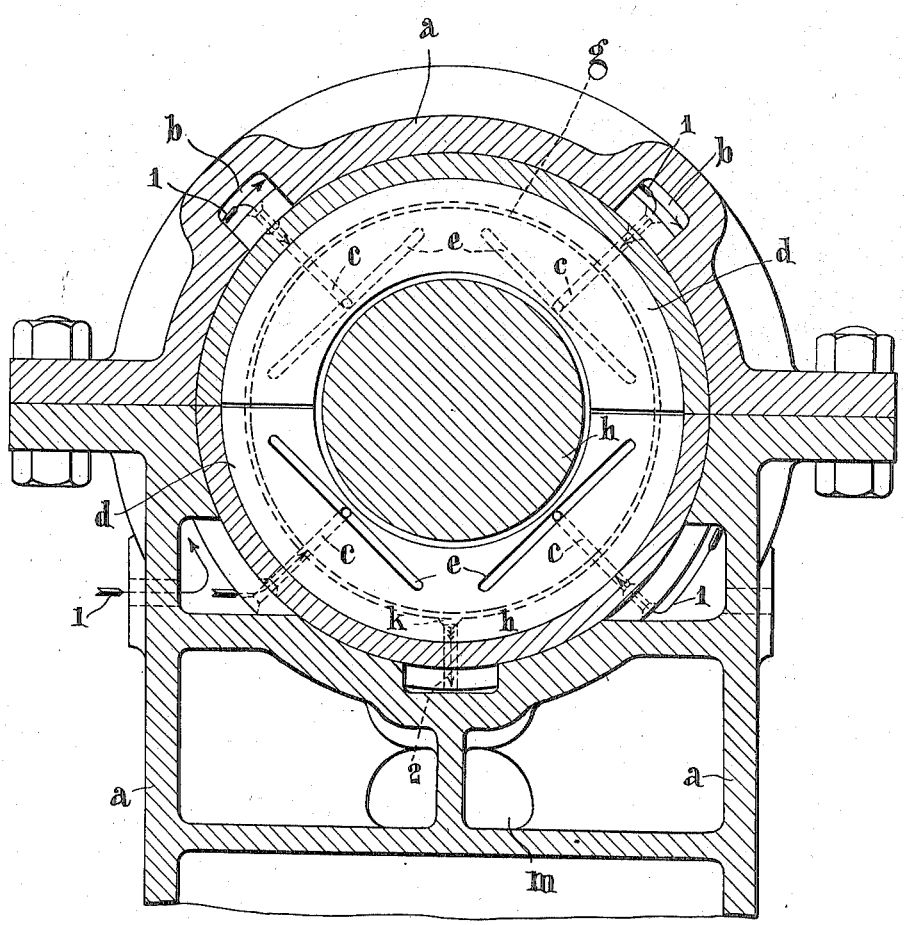

C. A. PARSONS & J. TURNBULL.
LUBRICATION OF THRUST BEARINGS.
APPLICATION FILED NOV. 22, 1909.
957,797.
Patented May 10, 1910.
10 SHEETS—SHEET 1.
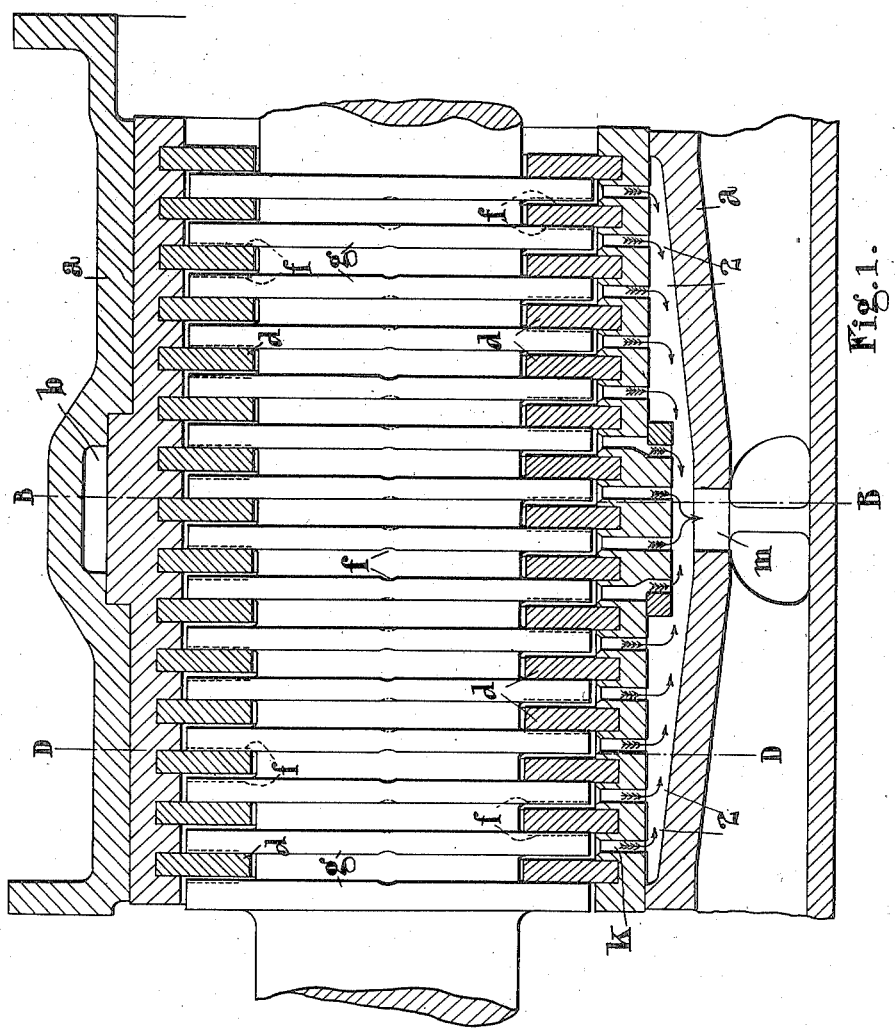

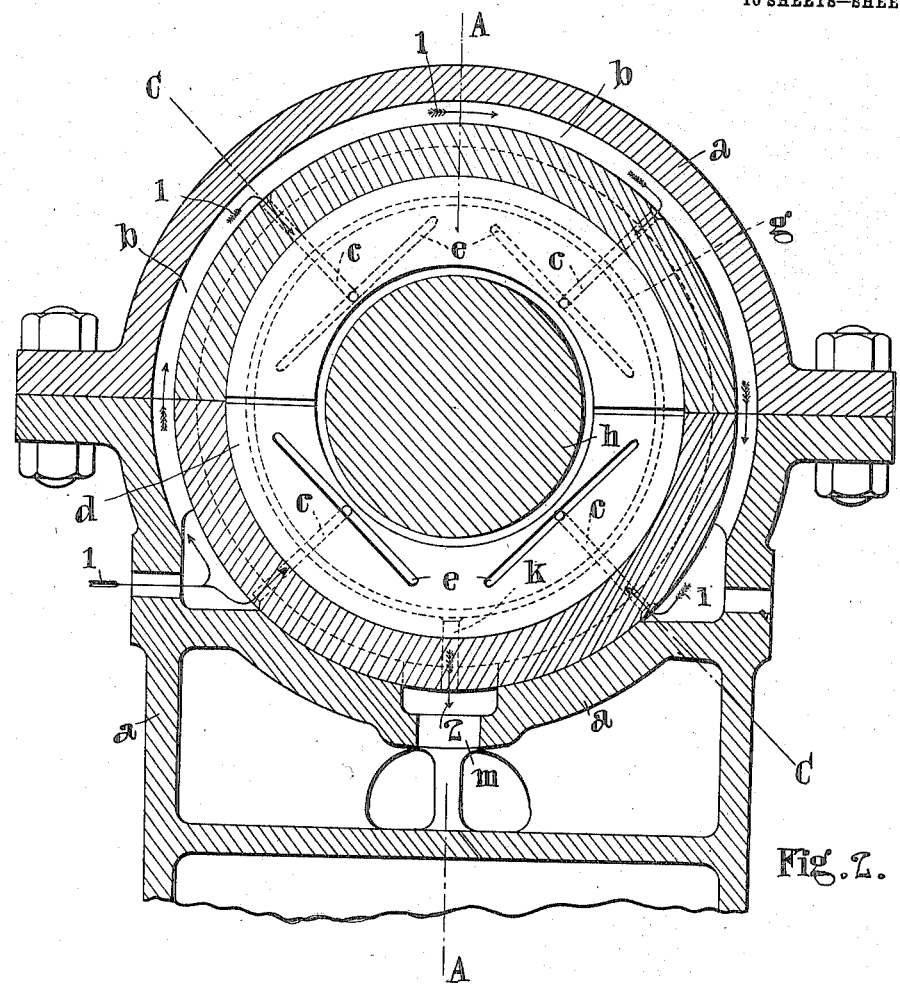
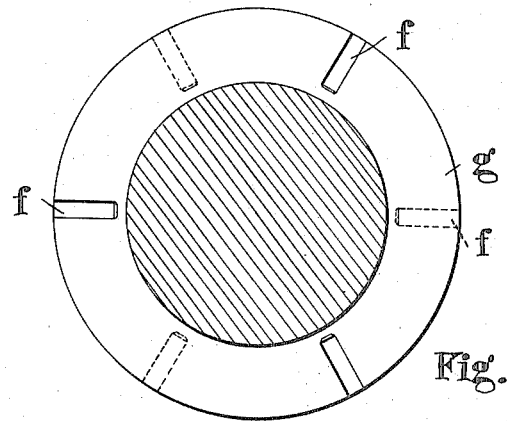

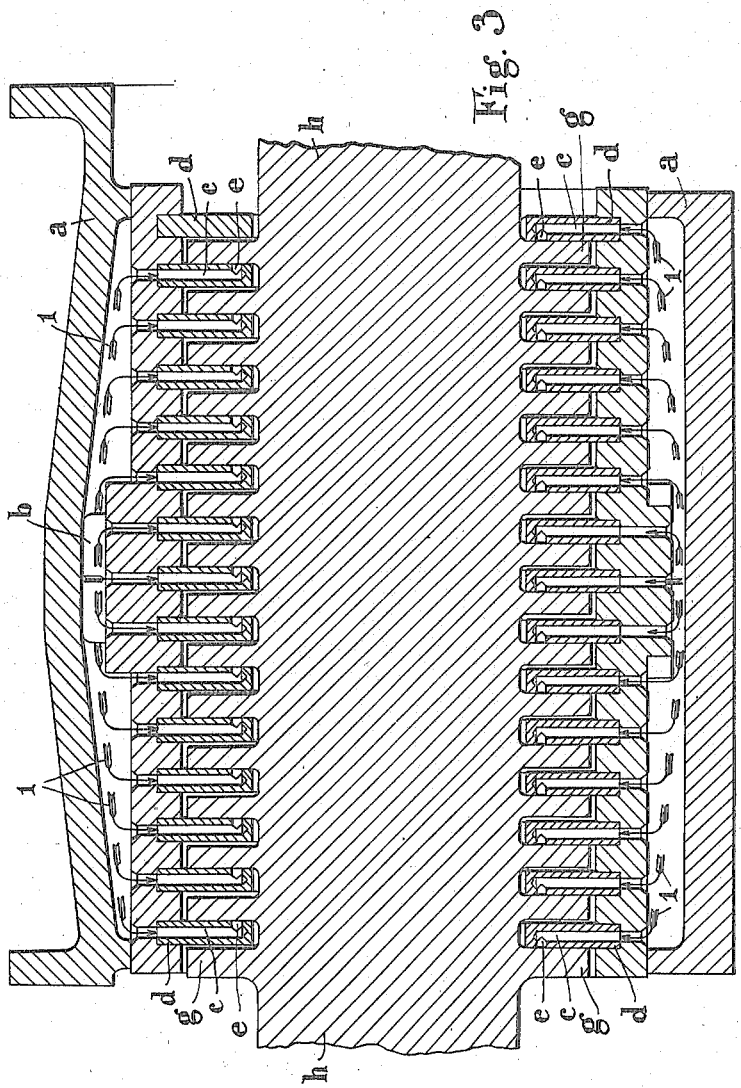

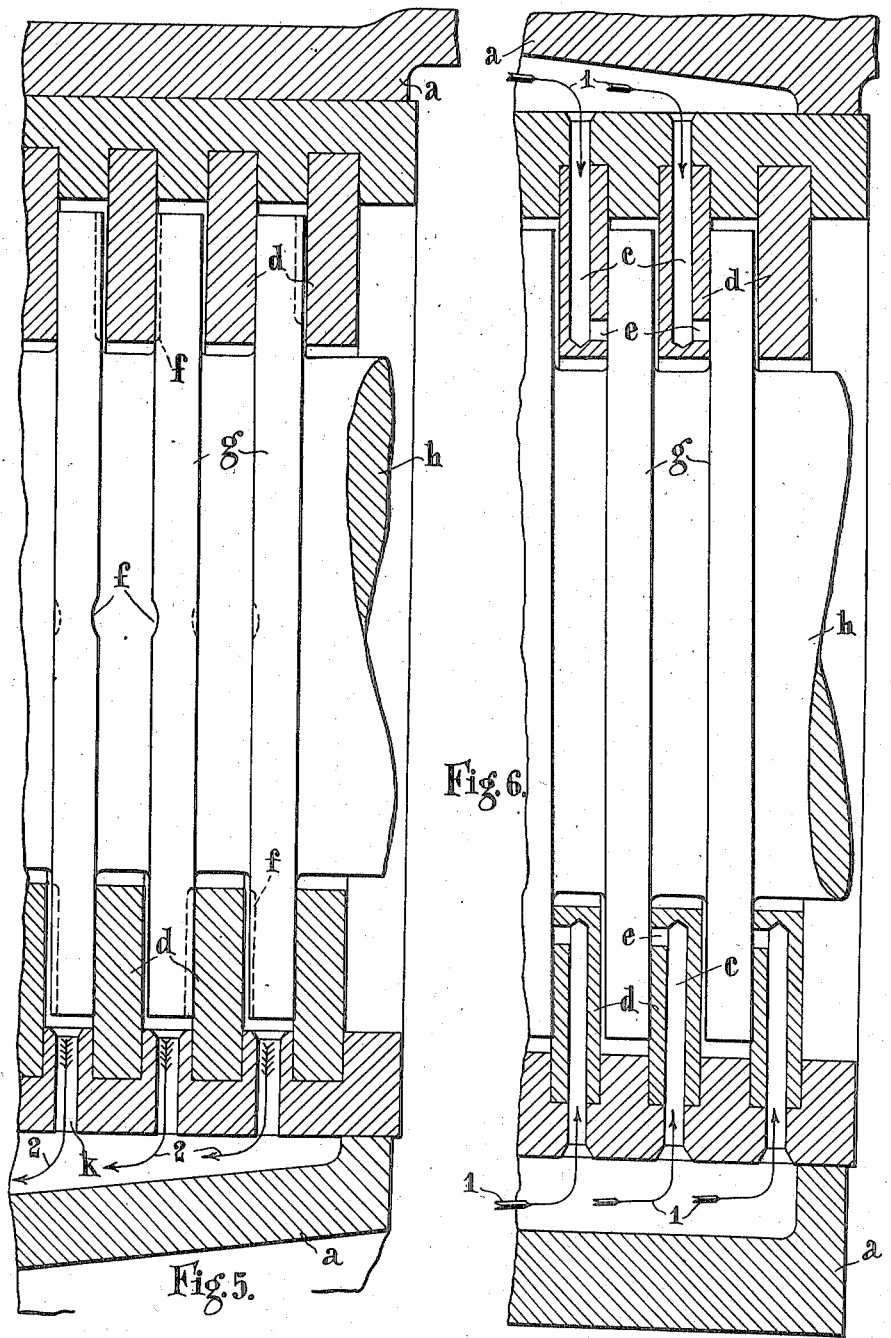

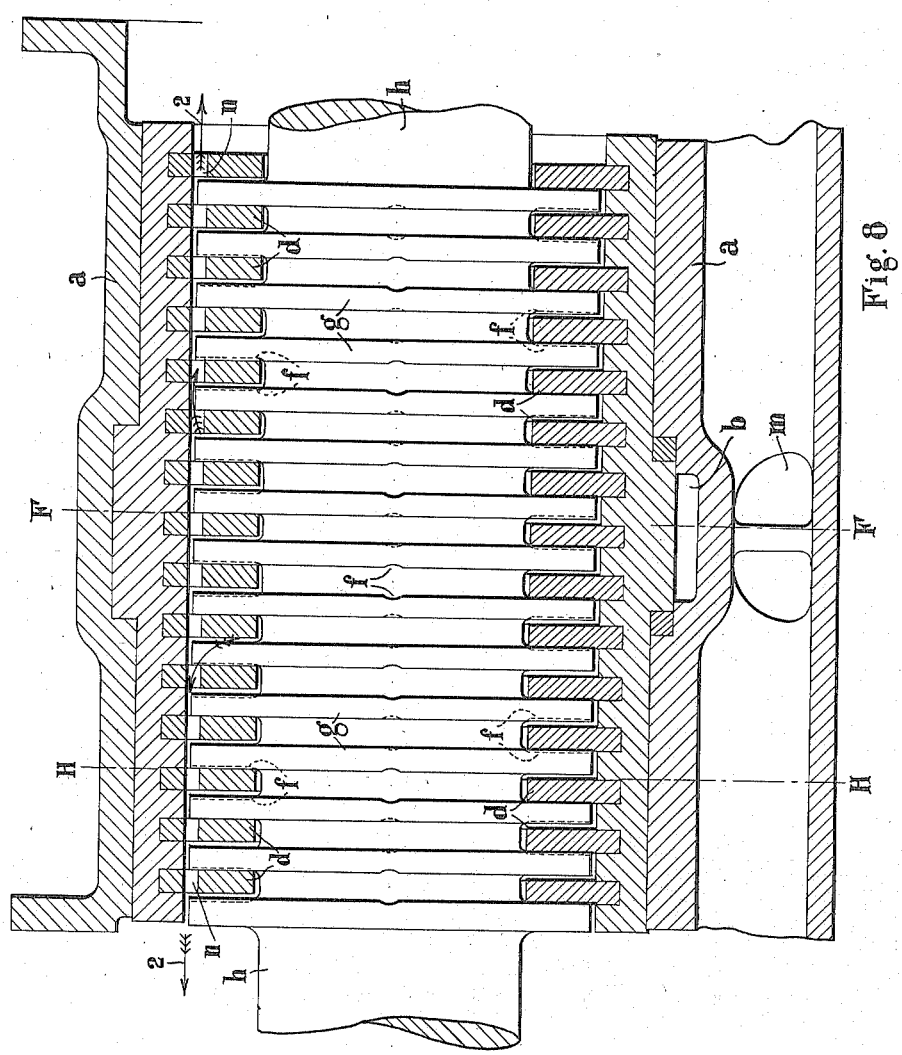

C. A. PARSONS & J. TURNBULL.
LUBRICATION OF THRUST BEARINGS.
APPLICATION FILED NOV. 22, 1909.

957,797.

Patented May 10, 1910.
10 SHEETS—SHEET 8.

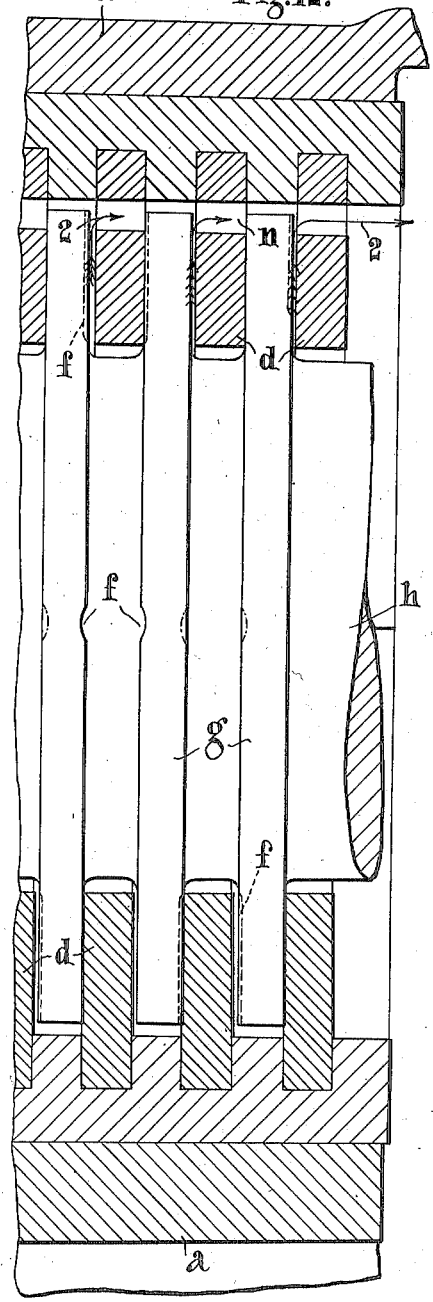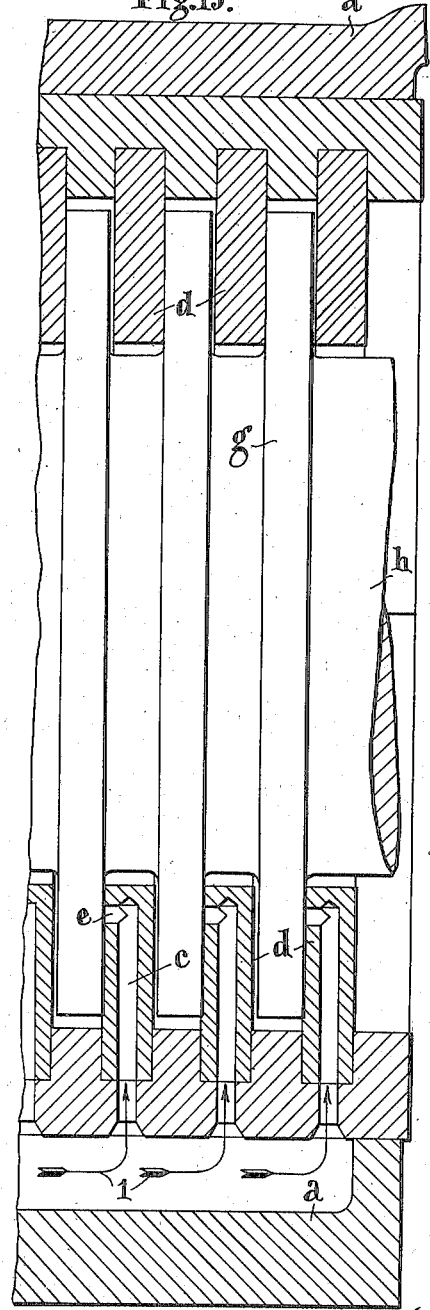

UNITED STATES PATENT OFFICE.

CHARLES ALGERNON PARSONS, OF NEWCASTLE-UPON-TYNE, AND JOHN TURNBULL, OF WALLSEND, ENGLAND; SAID TURNBULL ASSIGNOR TO SAID PARSONS.

LUBRICATION OF THRUST-BEARINGS.

957,797.      Specification of Letters Patent.     Patented May 10, 1910.

Application filed November 22, 1909. Serial No. 529,380.

*To all whom it may concern:*

Be it known that we, the Honorable CHARLES ALGERNON PARSONS C. B., a subject of the King of Great Britain and Ireland, and residing at Heaton Works, Newcastle-upon-Tyne, in the county of Northumberland, England, and JOHN TURNBULL, a subject of the King of Great Britain and Ireland, and residing at Turbinia Works, Wallsend-upon-Tyne, in the county of Northumberland, England, have invented certain new and useful Improvements in and Relating to the Lubrication of Thrust-Bearings, of which the following is a specification.

This invention relates to improvements in the lubrication of thrust bearings and adjusting blocks for rotating shafts and particularly to bearings of the multi ring and collar type.

In a thrust or adjusting block in which the lubricant is admitted into the recesses and spaces around and between the block and the shaft so as to flood the whole, the lubricant usually finds its way to the working faces by means of gutters cut in those faces generally in the stationary ring faces. The lubricant passes from one face to another and each ring depends entirely for its supply upon the discharge of hot lubricant from the preceding ring. This construction possesses the disadvantage that the lubricant depends for its distribution over the working faces chiefly upon capillary action and that the rings and collars remote from the lubricant inlet to the bearing are supplied chiefly with lubricant which has been heated by passing between the working faces of preceding rings and collars and has lost some proportion temporarily of its lubricating nature and therefore there is no certainty that cool oil will be supplied to each elemental collar independently. It has before been proposed to overcome this difficulty by supplying lubricant under pressure to each of the stationary elements independently of the remaining elements. This has been done by connecting a passage formed in each element to a common source of lubricant under pressure by a separate pipe having separate controlling valves. This construction is complicated and expensive and owing to the large number of joints in the piping the lubricant which is under pressure is apt to leak.

The object of the present invention is to provide improved and simplified constructions for supplying lubricant under pressure to thrust and adjusting blocks.

The invention consists in a thrust bearing in which lubricant under pressure is distributed by means of passages formed in the bearing body communicating with one or more passages formed in each of a plurality of stationary elements, these latter passages communicating with recesses or the like on either the ahead or astern or on both the ahead and astern working faces of the stationary elements.

By this invention it will be seen that the distribution of the lubricant to each stationary element is effected by passages formed in the bearing body, whereby the numerous pipe connections necessitated by the previous constructions are avoided.

The invention also consists in the improved thrust bearing lubricating arrangements hereinafter described.

Figure 9:
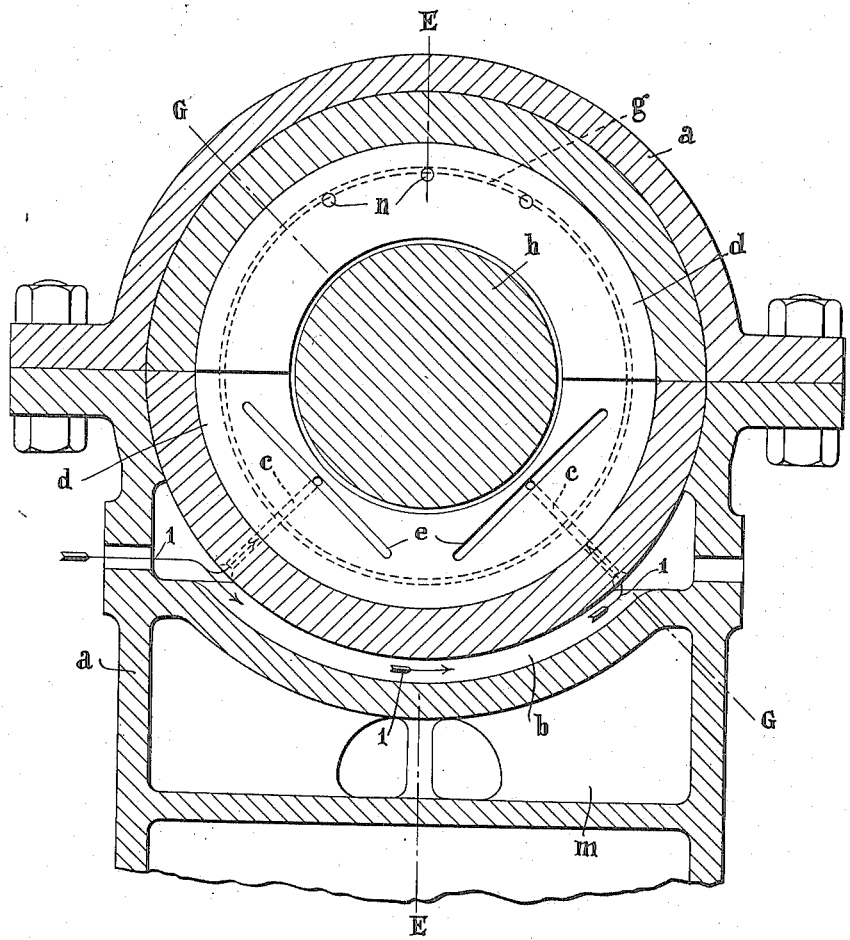
Figure 10:
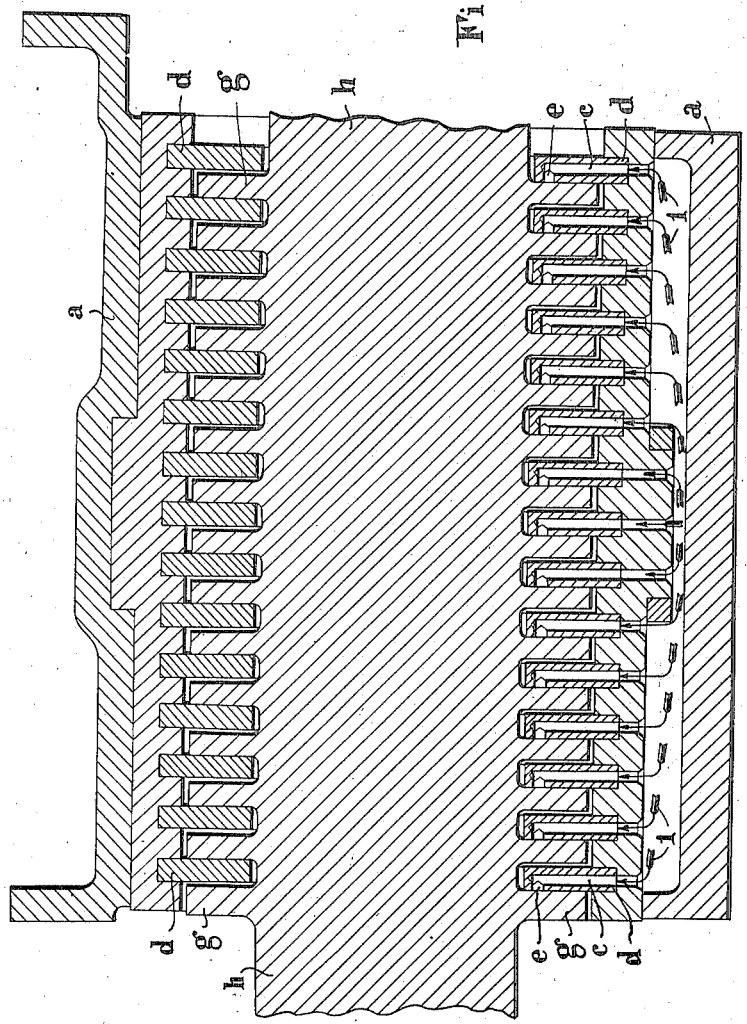
Figure 11:
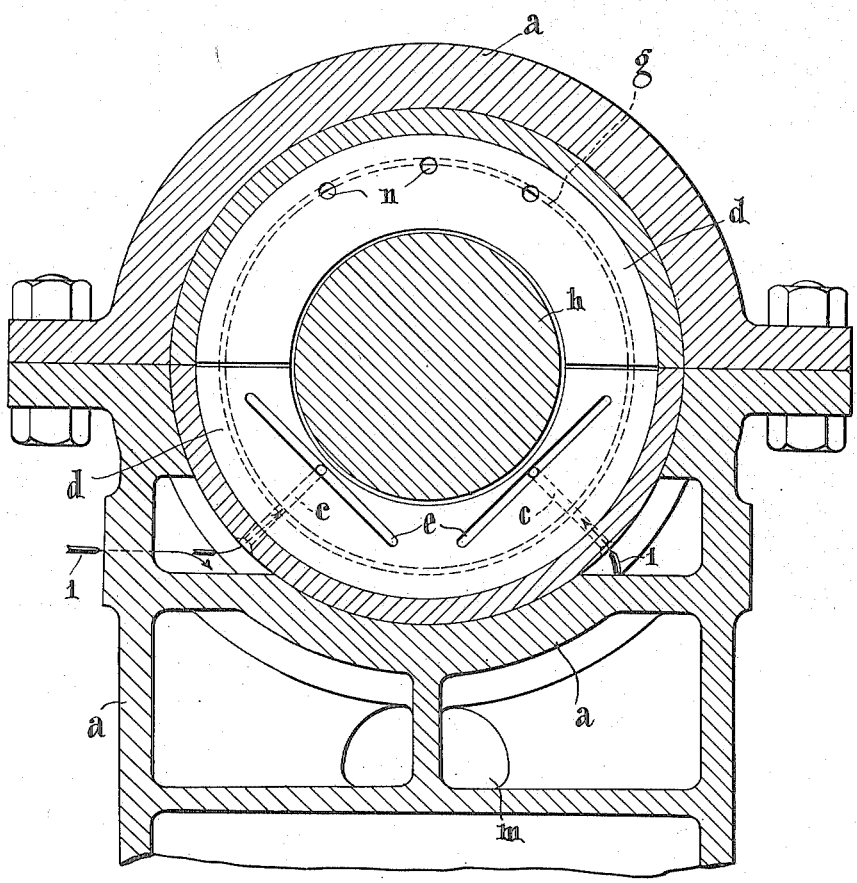

Referring now to the accompanying drawings:—Figure 1 is a longitudinal section of a thrust bearing with lubricating arrangements according to one form of this invention, the section being taken on the line A—A of Fig. 2. Fig. 2 is a section on the line B—B of Fig. 1. Fig. 3 is a section on the line C—C of Fig. 2. Fig. 4 is a section on the line D—D of Fig. 1. Figs. 5 and 6 are enlarged views of the right hand portion of the thrust bearing as shown in Figs. 1 and 3 respectively. Fig. 7 represents one of the thrust collars on the shaft having three gutters on each face. Fig. 8 is a longitudinal section of a thrust bearing with lubricating arrangements according to a modified form of this invention, the section being taken on the line E—E of Fig. 9. Fig. 9 is a section on the line F—F of Fig. 8. Fig. 10 is a section on the line G—G of Fig. 9. Fig. 11 is a section on the line H—H of Fig. 8. Figs. 12 and 13 are enlarged views of the right hand portion of the thrust bearing as shown in Figs. 8 and 9 respectively.

In carrying this invention into effect as applied to a multi ring and collar thrust bearing for a rotating shaft and as shown in Figs. 1 to 6, we provide in the bearing block or body casing, $a$, of the thrust bearing, passages or ducts, $b$, adapted to be supplied with lubricant under pressure by any suitable means. These passages or ducts, $b$, communicate with passages, c, formed in the stationary thrust elements, d, these passages, c, being preferably radial and of any desired number per element (for instance four). These radial passages, c, communicate with gutters or recesses, e, formed in the working faces of the stationary thrust elements d. These gutters, e, are preferably at right angles to the radial passages, c, and extend over a considerable chord of the face of the stationary elements, d. When four radial passages, c, are employed two of them may communicate with gutters in the ahead working face of the stationary thrust element and two with gutters or recesses in the astern working face of the element, as shown in Figs. 2 and 4. Further gutters or recesses, f, may be formed in one or both the working faces of the thrust collars, g, carried by the rotating shaft, h, as shown in Fig. 7 in which three such gutters are formed in each face.

The spaces between the fixed elements, d, in which the collars, g, carried by the shaft, h, rotate communicate by means of passages, k, with a waste oil drain, m, formed in the bottom of the casing, a.

The action of the device is as follows:— Oil is forced under pressure into the ducts, b, in the bearing casing, a; from there it passes to the radial passages, c, formed in the stationary thrust elements, d, and is distributed some on the ahead working face and some on the astern working face by means of the gutters, e, before mentioned. The arrows, 1, indicate the path of the oil entering and arrows, 2, the path of the oil leaving the bearing. Some of the lubricant is carried around by means of the gutters or recesses, f, formed in the working faces of the collars, g, carried by the shaft, h. A thorough distribution of the lubricant over the working face is thus effected. The lubricant works its way to the periphery of the rotating collars, g, and being thrown off from these passes to the drain, m, by the passages, k. It will be seen that according to this arrangement each pair of stationary thrust elements, d, and of rotating collars, g, receives an individual and continuous supply of cold lubricant, the hot lubricant leaving the working surfaces finding its way directly to the drain, m.

According to a modified construction as shown in Figs. 8 to 13, we provide the passages, b, in the casing, a, and the radial passages, c, as in the previous construction but the radial passages, c, communicate with one face only of the stationary thrust elements, d, viz., the ahead working faces. In this construction the drain passages are situated at the top instead of at the bottom of the bearing and preferably consist of holes, n, formed axially through the stationary thrust elements, d, communicating with waste oil recesses, m, formed at each end of the bearing. The action of this modified construction is as follows: the path of the oil being indicated by arrows, 1 and 2, as before:— The oil under pressure from the ducts or passages, b, formed in the casing, a, finds its way through the radial passages or ducts, c, in the stationary elements, d, to the gutters or recesses, e, formed in the working faces of the stationary elements, d, but as the ducts, e, are only formed in this modification, in the ahead working face all the lubricant under pressure has to find its way between the ahead working faces before escaping. As however the drain is situated in the upper part of the bearing the spaces around the collars, g, and between the astern working faces of the collars, g, and the stationary elements, d, become filled with lubricant escaping from the periphery of the rotating collars g. In this manner forced cold lubrication is provided for the ahead working surfaces which are the surfaces most often in use and bath lubrication is provided for the astern faces which are less frequently in use. As the ahead and astern faces cannot be in operation simultaneously although always in contact, therefore when astern face is in action the cool oil passes freely over the ahead face to supply a cool bath for astern face. It is to be understood that in this modification also recesses or gutters, f, may be formed in one or both the working faces of the collars, g, as well as the recesses or gutters, e, in the stationary elements, d.

As will be seen from the drawings the stationary elements, d, are formed in two pieces set so as to bear one on the ahead face of a collar, g, on the shaft, h, and the other on the astern face of the adjacent collar, and passages, c, and recesses, e, in the corresponding parts of the same stationary element are, in the first modification (Figs. 1 to 6) oppositely turned so as to supply the lubricant to the face of each part of the stationary element in contact with a collar, g, on the shaft, while in the second modification (Figs. 8 to 13) pressure feed is obtained to the face of the lower half of the stationary element, d, in contact with the collar, g, and a good supply of lubricant through the holes, n, to the contacting faces of the corresponding top half of that stationary element is obtained owing to the space for the accumulation of lubricant between the top half of the stationary element and the collar on the shaft against which the lower half of said stationary element bears. By this construction very little end movement of the shaft, h, is allowed owing to both the ahead and astern faces of the stationary elements, d, being always in contact with the shaft collars, g, while an efficient supply of cool lubricant is insured to the working face of each stationary element. It will also be seen that the lubricant is fed directly to only one passage in the bearing body from whence it is distributed by other passages to each stationary element independently of the remaining elements. In this manner the number of connections for supplying lubricant to these stationary elements is considerably reduced, for instance although two connections to the first mentioned passage in the bearing body are shown in the drawings, one might only be used if desired.

It will be seen that many modifications may be made in the manner of carrying this invention into effect without departing from the spirit of the same.

Having now described our invention what we claim as new and desire to secure by Letters Patent is:—

1. A thrust and adjusting block comprising in combination a rotating member, pressure bearing elements attached to said member, annular stationary elements surrounding said rotating member and in contact with said pressure bearing elements, said stationary elements having recesses in their faces and each element also having a number of radial passages therein communicating with the recesses, said body having a passage therein extending partly around the same and communicating with all of the radial passages and a common outlet and means for delivering lubricant under pressure to said passage in the body.

2. A thrust and adjusting block comprising in combination a rotating member, pressure bearing elements attached to said member and having distributing recesses in their faces, a body encircling said member and formed in two parts, stationary elements attached to said body and being formed in two parts, one part of each element bearing on the ahead face of one adjacent pressure bearing element and the other part on the astern face of the other adjacent pressure bearing element, said stationary elements having recesses in their bearing faces and each element also having radial passages therein communicating with said recesses, said body having a passage therein extending partly around the same and communicating with all of said radial passages and said body also having an outlet port communicating with the spaces between the stationary elements.

In testimony whereof, we affix our signatures in presence of two witnesses.

CHARLES ALGERNON PARSONS.
JOHN TURNBULL.

Witnesses:
FREDERICK GORDON HAY BEDFORD,
ALBERT WILLIAM PARR.